United States Patent
Shull et al.

(10) Patent No.: US 7,635,737 B2
(45) Date of Patent: Dec. 22, 2009

(54) MODIFIED ACRYLIC BLOCK COPOLYMERS FOR HYDROGELS AND PRESSURE SENSITIVE WET ADHESIVES

(76) Inventors: Kenneth R. Shull, 2220 Campus Dr., 2081 EV3108, Evanston, IL (US) 60201; Murat Guvendiren, 633 Clark St., Evanston, IL (US) 60201; Phillip B. Messersmith, 2145 Sheridan Rd., Biomedical Engineering Department, Clarendon Hills, IL (US) 60208; Bruce P. Lee, 515 Science Dr., Suite 215, University Research Park, Madison, WI (US) 53711

( * ) Notice: Subject to any disclaimer, the term of this patent is extended or adjusted under 35 U.S.C. 154(b) by 0 days.

(21) Appl. No.: 12/395,126

(22) Filed: Feb. 27, 2009

(65) Prior Publication Data
US 2009/0163661 A1   Jun. 25, 2009

Related U.S. Application Data

(62) Division of application No. 11/676,099, filed on Feb. 16, 2007.

(60) Provisional application No. 60/773,910, filed on Feb. 16, 2006.

(51) Int. Cl.
C08F 297/02 (2006.01)
C08F 4/00 (2006.01)
C08F 293/00 (2006.01)

(52) U.S. Cl. .................. 525/242; 525/244; 525/280; 526/317.1; 526/319

(58) Field of Classification Search ............... 525/242, 525/244, 280; 526/317.1, 319
See application file for complete search history.

(56) References Cited

OTHER PUBLICATIONS

Yao et al. "Association behavior of poly(methyl methacrylate-b-methacrylic acid-b-methyl methacrylate) in aqueous medium", 2004, Polymer, vol. 45, pp. 2781-2791.*

* cited by examiner

Primary Examiner—David Wu
Assistant Examiner—Michael M Bernshteyn
(74) Attorney, Agent, or Firm—Quarles & Brady, LLP

(57) ABSTRACT

A method of producing an acrylic block copolymer comprising hydrophobic poly (lower alkyl methoacrylate), hydrophilic poly (lower alkyl methacrylic acid), and hydrophobic poly (lower alkyl methacrylate).

3 Claims, 8 Drawing Sheets

MODIFIED ACRYLIC BLOCK COPOLYMERS FOR HYDROGELS AND PRESSURE SENSITIVE WET ADHESIVES

CROSS-REFERENCE TO RELATED APPLICATIONS

This application is a Divisional Application of U.S. patent application Ser. No. 11/676,099, filed Feb. 16, 2007, entitled "Modified Acrylic Block Copolymers for Hydrogels and Pressure Sensitive Wet Adhesives", which claims the priority date of provisional patent application 60/773,910, filed Feb. 16, 2006, is claimed herein. The disclosure of the 60/773,910 application is also incorporated by reference herein.

STATEMENT REGARDING FEDERALLY SPONSORED RESEARCH OR DEVELOPMENT

This invention was made with government support under Grant No. R01 DE014193 awarded by the National Institutes of Health and Grant No. DMR 0214146 awarded by the National Science Foundation. The government has certain rights in the invention.

BACKGROUND OF THE INVENTION

There is a growing demand for bioadhesives that can be easily delivered and that solidify in situ to form strong and durable interfacial adhesive bonds and are resistant to the normally detrimental effects of water. Some of the potential applications for such biomaterials include consumer adhesives, bandage adhesives, tissue adhesives, bonding agents for implants, and drug delivery. It is also preferable to prepare these adhesives in a toxicologically acceptable solvent that enables injection to the desired site and permits a conformal matching of the desired geometry at the application site.

BRIEF SUMMARY OF THE INVENTION

Briefly, in one aspect, the present invention addresses, in part, the above demand with a modified acrylic block, especially triblock, copolymer system, which can be fully dissolved in toxicologically acceptable organic solvents. In this approach, hydrophilic and hydrophobic lower alkyl methacrylate copolymer "blocks" are chosen or are created so that hydrogels can be formed by a solvent exchange mechanism when a solution of the block copolymer in an acceptable solvent is exposed to water that is naturally present within the body and gels. By this process in situ formation of a bioadhesive in an aqueous environment is accomplished. "Lower alkyl" will be understood by one skilled in this art generally to mean having about 1 to 6 carbon atoms and being predominantly but not necessarily exclusively hydrocarbon in nature. Preferred lower alkyl moieties herein are methyl and tert-butyl.

In one embodiment of this invention poly(methyl methacrylate-tert-butyl methacrylate-methyl methacrylate) (PMMA-PtBMA-PMMA) triblock copolymer is synthesized by anionic polymerization. The PtBMA midblock is then converted to hydrophilic poly-methacrylic acid (PMAA).

In a further embodiment of this invention, the above block (co)-polymers were modified with L-3,4-dihydroxyphenylalanine (DOPA), a modified amino acid that is believed to be responsible for wet adhesion in mussel adhesive proteins. The preferred triblock polymer, so modified, was fully dissolved in N-methylpyrrolidone (NMP), dimethyl sulfoxide (DMSO), or dimethylformamide (DMF), and hydrogels were formed by exposing the solutions to saturated water vapor.

It is significant to note that the preferred PtBMA, after conversion to pMAA, noted above has the advantage of being easily modified to have other functional groups such as —$NH_2$, —OH. The —COOH and —OH derivatives are particularly preferred because they permit ester bond or linkages to be formed, e.g., to a drug or other agent or species. Hydrolysis of the ester linkages provides, for example, drug or agent release. It will also be appreciated by one skilled in the art that the preferred pMAA can be reacted with many compounds in addition to the DOPA disclosed herein.

Monomers other than tBMA can certainly be used to create the hydrophilic mid-block, whether in a protected or unprotected configuration. Protecting groups such as carbobenzyloxy (Cbz) and tert-butylmethylsilyl (TBDMS) are well known protecting groups for —$NH_2$ and —OH, respectively. 2-methylallylamine and 2-methyllyl alcohol are possible substitutes for tBMA.

One skilled in the art will appreciate that this invention involves the steps of inducing gel formation by solvent exchange in a multi-block co-polymer having two or more "blocks." The copolymer blocks are selected for their hydrophobicity/hydrophilicity to produce gels. The blocks are also selected, or modified, to incorporate specific and specified functional groups chosen to control, primarily to enhance, adhesive interactions. Specific embodiments of the invention disclosed herein should not be used narrowly to interpret the more general scope of this invention.

BRIEF DESCRIPTION OF THE DRAWINGS

The present invention will now be illustrated, in its preferred practice, by the description below. The attached claims should not be narrowly construed in view of the disclosure hereof and of the attached figures in which:

DETAILED DESCRIPTION OF THE INVENTION AND EXAMPLES

Triblock Copolymer Synthesis

Materials

Methyl methacrylate (MMA) and tert-butyl methacrylate (tBMA) were purified by addition of triethylaluminum (AlEt$_3$, Aldrich) solution in hexane until a persistent yellowish color was observed. After degassing by freezing in liquid nitrogen (−78° C.), tBMA was distilled under reduced pressure and stored in freezer whereas MMA was distilled directly into the reaction chamber prior to polymerization. Diphenylethylene (DPE, Aldrich) was purified by addition on sec-butyllithium (s-BuLi, Aldrich) until a persistent green color was observed. The solution was stirred under nitrogen overnight, and distilled under reduced atmosphere after degassing, and stored in the freezer. Difunctional initiator was prepared by the reaction of Li and Naphthalene (both as received) in distilled THF at room temperature for 24 hrs under nitrogen atmosphere. As Li reacts with Naphthalene, the color of the solution became dark green. LiCl was dried in the reaction chamber at 130° C. under vacuum overnight. Sodium (dispersion in Paraffin) and benzophenone were added to the THF, and refluxed until a persistent purple color was observed.

Anionic Triblock Copolymer Synthesis(Rxn 1)

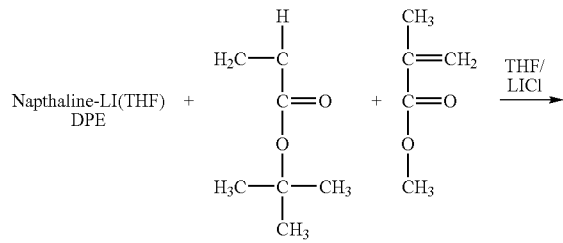

Anionic polymerization of tBMA and MMA (FIG. 1) was carried out under a nitrogen atmosphere by using a difunctional initiator. THF was distilled into the reaction chamber and stirred for 30 minutes to dissolve the LiCl. The concentration of initiator was determined by titration of the green initiator solution with a known amount of acetanilide in distilled IHF prior to addition. The chamber was then cooled with a MeOH/dry ice bath, and the IHF solution was titrated by adding a few drops of initiator until a faint green color was observed. The calculated volume of initiator was added, and a dark green color was observed immediately. After addition of the DPE, the green color immediately turned into a deep red. The deep red color immediately disappeared when the tBMA was introduced dropwise into the reaction flask. The polymerization was allowed to proceed at −78° C. for 2 hours. A small sample was taken by using a steel needle just before MMA transfer in order to determine the molecular weight of the tBMA block. MMA was then distilled into the reaction chamber, and the solution was stirred for 1 h before termination with anhydrous MeOH. The final solution was concentrated and precipitated into methanol-water (90:10) mixture under stirring. The polymer was dried under vacuum overnight.

Figure 1:
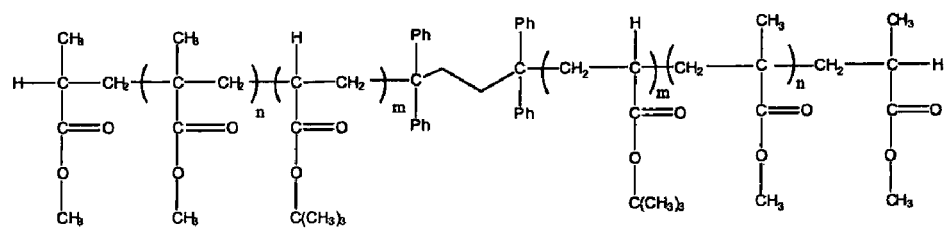
FIG. 1 is a chemical structure of synthesized PMMA-PTBMA-PMMA triblock copolymer obtained by anionic polymerization with sequential monomer addition using a difunctional initiator.

The total molecular weight of the polymer as determined by GPC was 120,000 g/mole with a polydispersity index of 1.08. The molecular weight of the midblock was 80,000 g/mole. The chemical structure of this triblock copolymer is shown in FIG. 1.

Conversion of Midblock into Methacrylic Acid

Figure 2:
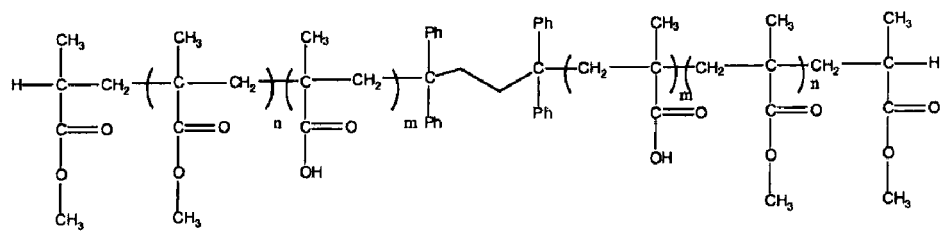
FIG. 2 is the chemical structure of a converted acrylic triblock polymer (i.e., to PMMA-PMAA-PMMA) such as that shown in FIG. 1.

PMMA-PtBMA-PMMA triblock copolymer was completely dissolved in dioxane, and hydrolyzed with hydrochloric acid at 80° C. for 6 hrs. The colorless solution became yellowish with time. The solution was precipitated in hexane, and the polymer was washed with hexane and water several times before it was dried under vacuum overnight. After conversion 1H NMR showed that the t-C(CH3)3 signal (at 1.43 ppm) had completely disappeared, indicating that the conversion was complete, giving the polymer structure shown in FIG. 2.

Figure 3:
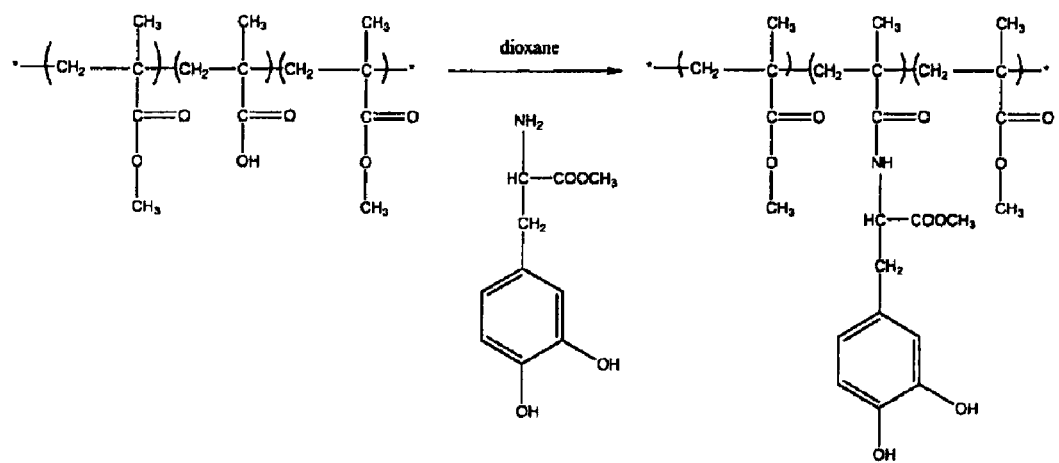
FIG. 3 is the chemical structure of DOPA modified PMMA-PMAA-PMMA.

The PMMA-PMAA-PMMA triblock copolymer synthesized above was completely dissolved in DMF. DOPA methyl ester (DME), 1-hydroxybenzotriazole hydratre (HOBT) and o-benzotriazole-N,N,N$_i^-$,N$_i^-$-tetramethyl-uronium-hexafluoro-phosphate (HBTU) were dissolved in DMF in separate vials and added into the triblock solution in the written sequential order. The reaction was completed after the addition of triethylamine (E$_{t3}$N). All reactions were carried out under nitrogen atmosphere to give the DOPA-containing polymers shown in FIG. 3. The hydrogel-forming experiments described below were performed on polymers that do not contain DOPA.

Hydrogel Formation and Characterization

Bulk Gel Properties (Characterization)

Figure 4:
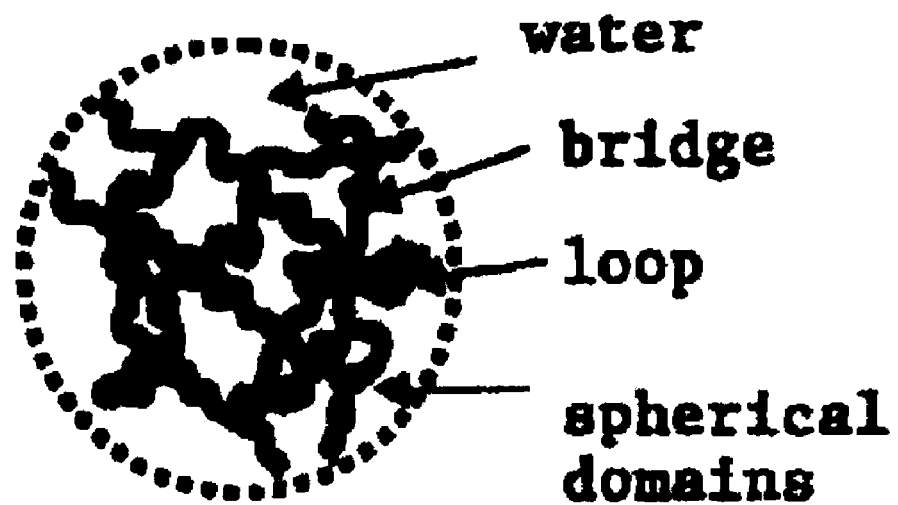
FIG. 4 illustrates the assumed molecular structure of the resulting gel.

The triblock copolymer was dissolved in a solvent that is a good solvent for both mid-and end-blocks. The solution was poured into a circular washer which was attached to a glass slide. Then it was exposed to a saturated water environment for a sufficient period of time to enable water diffusion into the solution. As water diffuses into the solution and the original solvent diffuses out, the hydrophobic end-blocks aggregate and form spherical domains. The hydrophilic mid-block forms bridges between these domains, and also loops, as shown schematically in FIG. 4. FIG. 4 is a picture of a hydrogel after equilibration with a saturated water environment (left) and the assumed molecular structure of the gel (right).

Axisymmetric Adhesion Tests

Figure 5A:
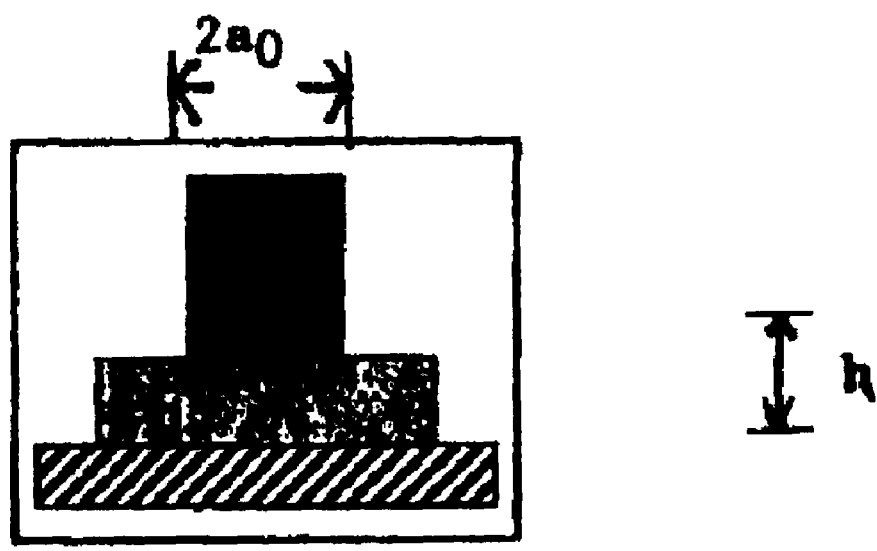
FIG. 5($a$) is a schematic drawing of the sample geometry and ($b$) is a drawing of the adhesion testing apparatus as used with this invention. The punch radius is $a_0$ and "h" is the thickness of the elastic layer.
Figure 5B:
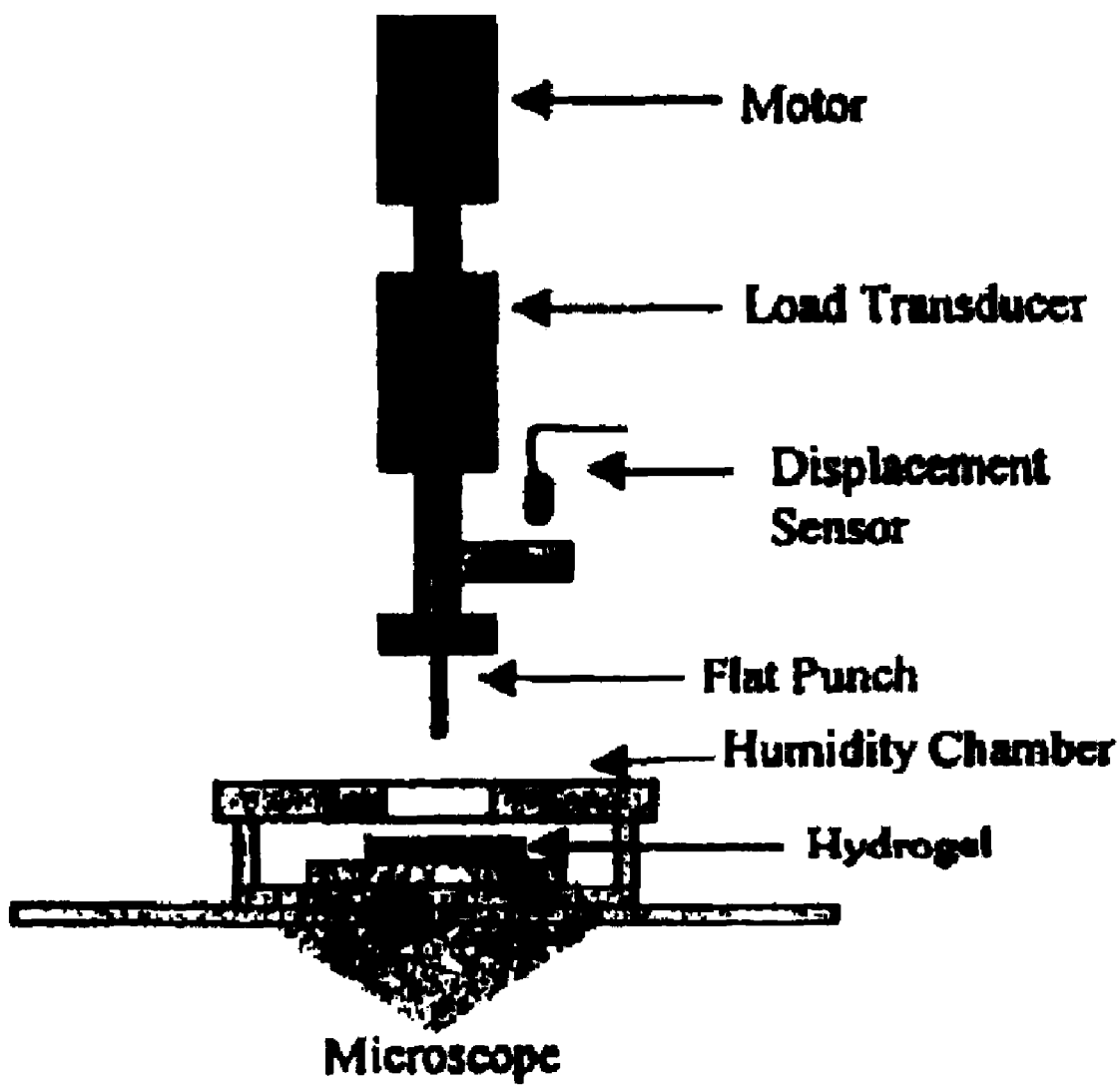

The experimental setup utilized for adhesion experiments and determination of the elastic moduls is shown schematically FIG. 5. A flat punch is driven by an inchworm motor and is attached to a 50 g load transducer. A fiber optic displacement sensor is used to measure displacement of the punch. FIG. 5 is a schematic drawing of (a) the sample geometry and (b) the adhesion testing apparatus. Note that a, is the punch radius and b is the thickness of the elastic layer.

The geometry of the mechanical test provides a well defined contact radius that corresponds to the punch radius, a. Young's modulus of the gel, E, is determined from the relationship between the load, P and the displacement, δ, utilizing the following expression.

$$E = \frac{3P}{8a\delta}\left[1 + 1.33\left(\frac{a}{h}\right) + 1.33\left(\frac{a}{h}\right)^3\right]^{-1}$$

The energy release rate (G) can be calculated from the following equation:

$$G = \frac{3(P_t)^2}{32\pi E a^3}$$

where $P_t$ is the measured tensile load.

The frequency-dependent dynamic moduli are measured by applying a sinusoidally varying displacement to the sample.

Figure 6:
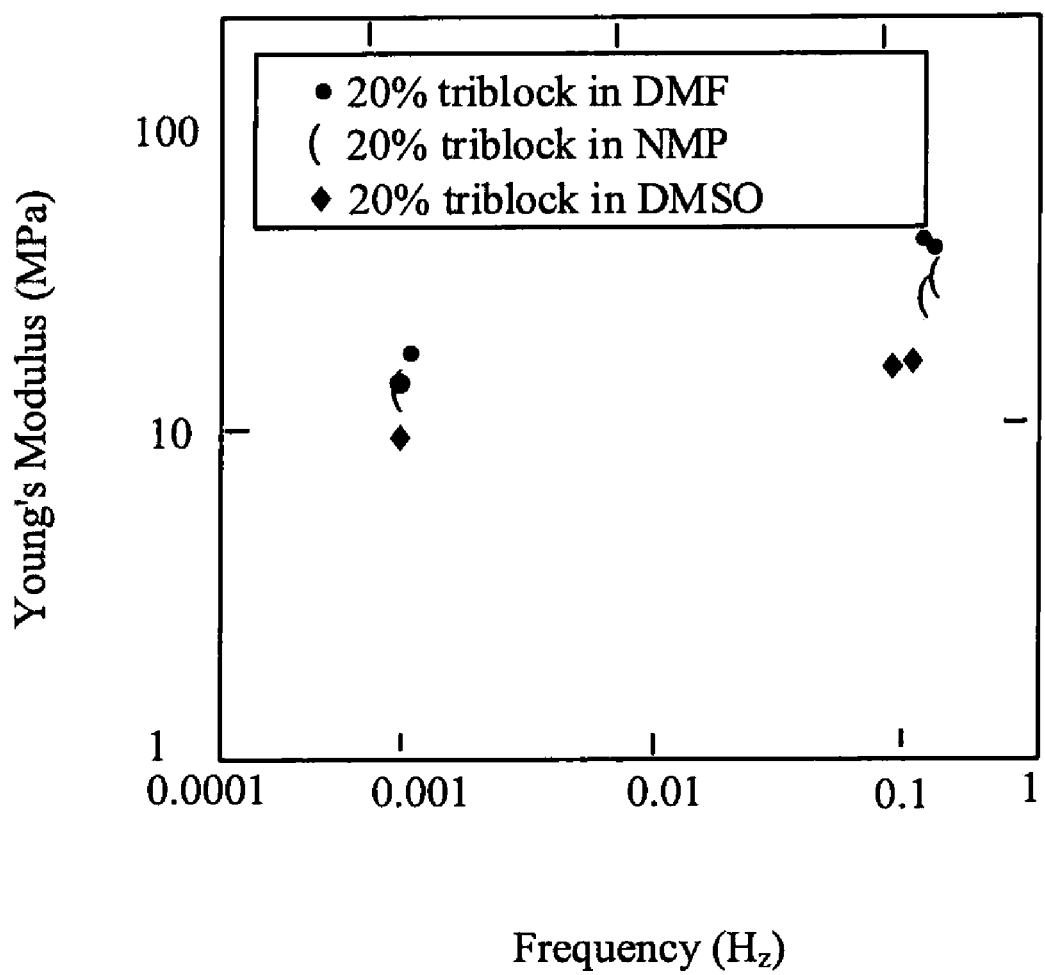
FIG. 6 is a plot of frequency (Hertz, Hz) vs. Young's Modulus (Mega Pascal's-MPa) for triblock copolymers of this invention comprising 20% in DMF, NMP, and DMSO, as shown.

Measured values of the elastic modulus are plotted in FIG. 6. Gels were prepared as described before, and exposed to humidity in a closed environment until the size and elastic properties of the gels no longer changed with time (typically 3 days). The moduli range from 10 to 30 MPa, depending on the initial solvent that was used. FIG. 6 shows the magnitude of the complex Young's modulus at different frequencies for hydrogels that were formed from the triblock formed in 20% solution of DMF, NMP and DMSO. Equilibrated gel thicknesses were around 2 mm.

Figure 7:
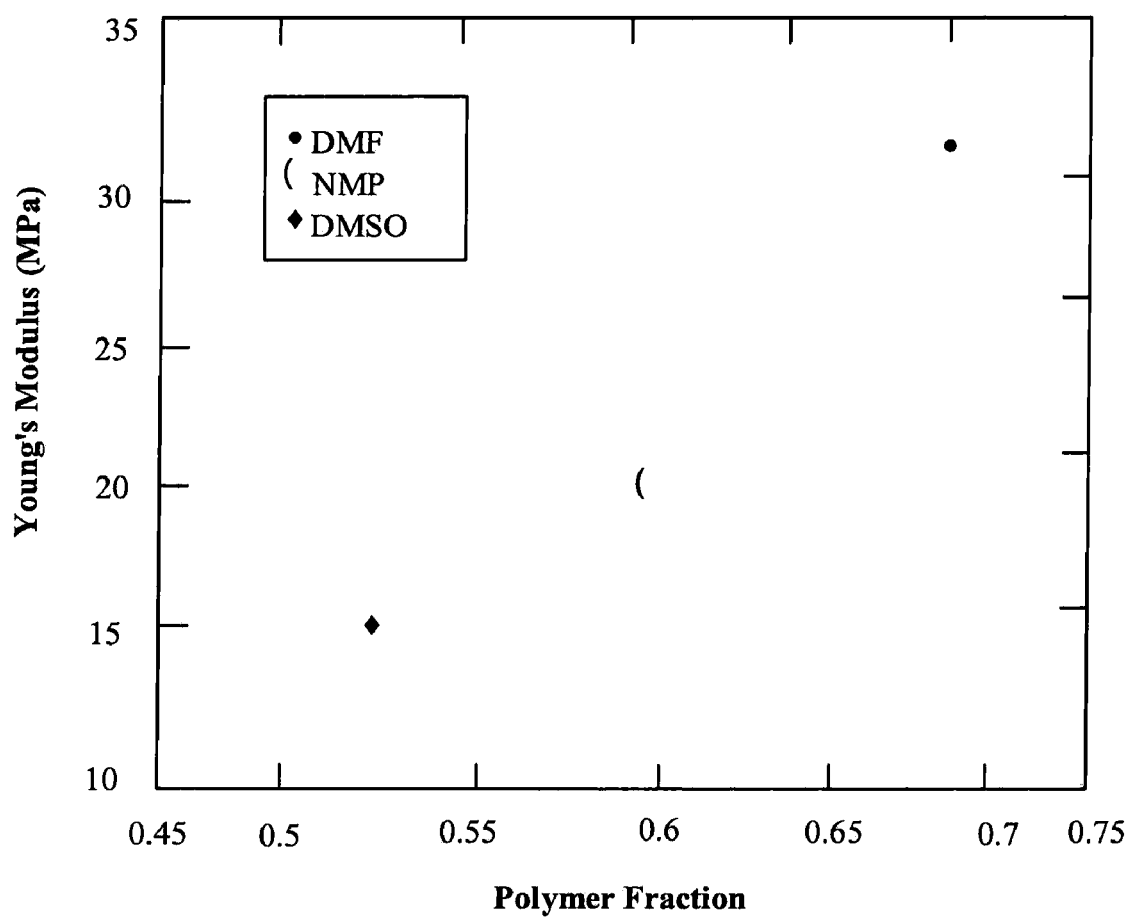
FIG. 7 is a plot of polymer fraction vs. Young's Modulus in the same solvents used in FIG. 6.

The relation between elastic modulus and equilibrium polymer concentrations of the hydrogels is given in FIG. 7. It is clear that elastic modulus increases with increasing polymer concentration, and that the final polymer concentration depends on the solvent in which the triblock copolymer was originally dissolved. FIG. 7 shows Young's Modulus at 0.1 Hz plotted against final polymer concentration after equilibration with saturated water vapor.

Figure 8:
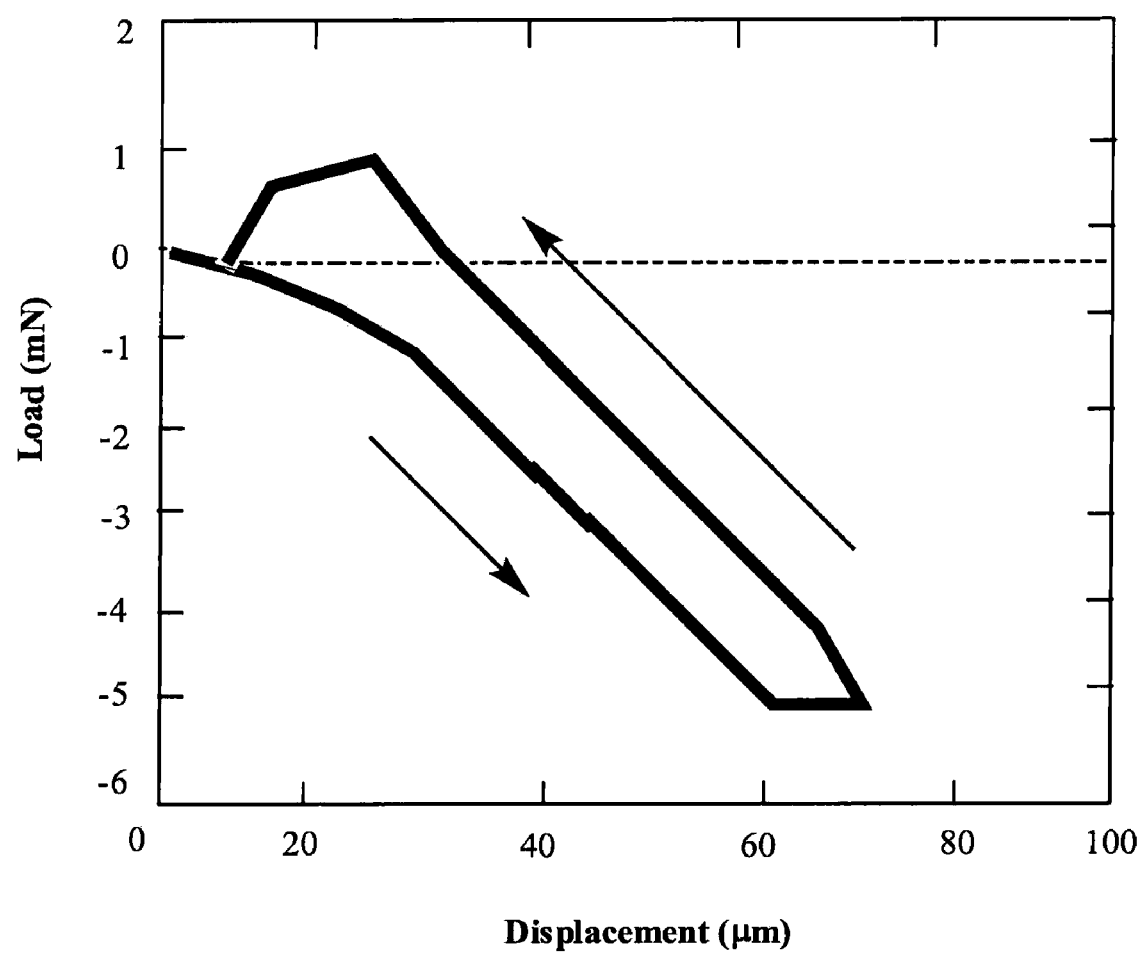
FIG. 8 is a load vs. displacement plot for a hydrogel after equilibration with a saturated water environment; a hyrdogel of 20% tricopolymer block solution in DMSO.
Figure 9:
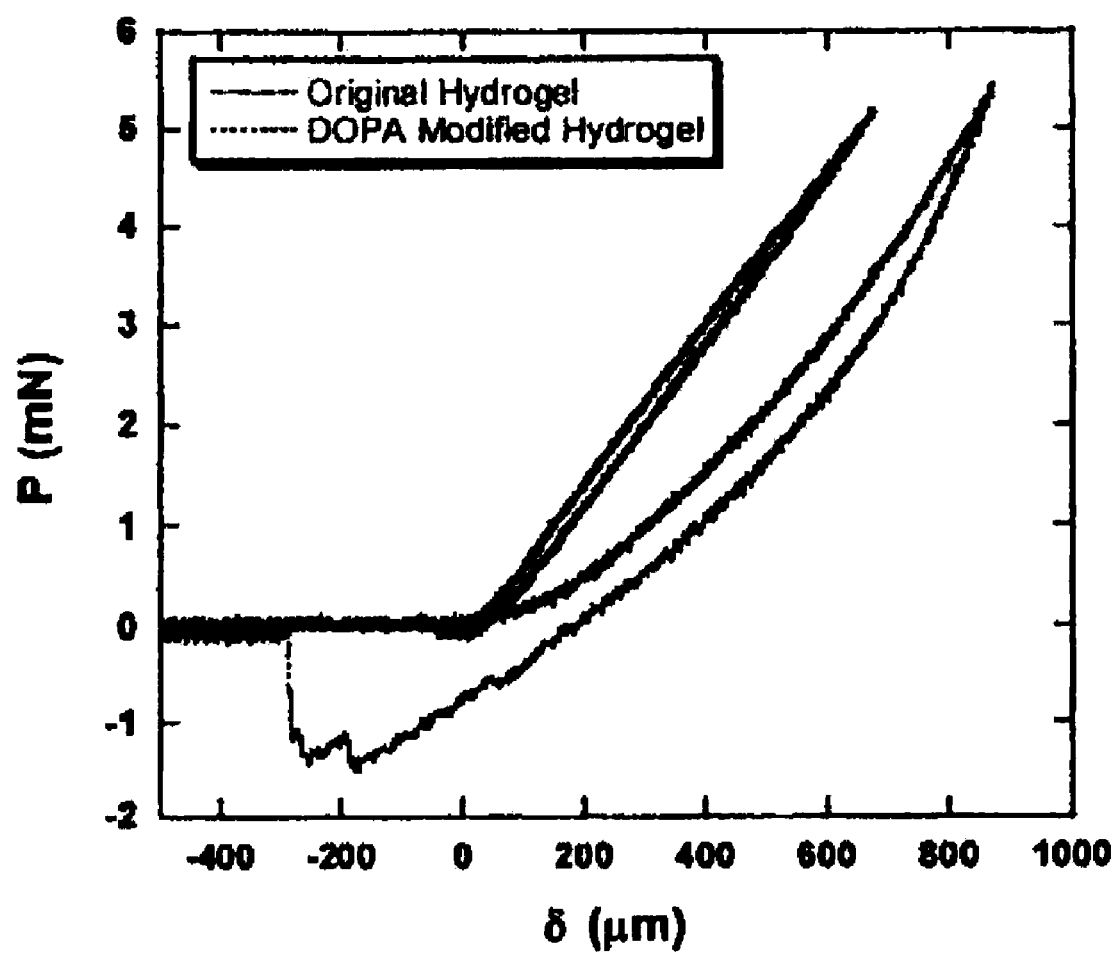
FIG. 9 load-displacement curves of original and DOPA-modified hydrogels contracting $TiO_2$ coated surface in controlled buffer.

Preliminary adhesion experiments were also performed by using a steel punch having a radius of 0.39 mm. A load-displacement plot for a sample prepared from DMSO is shown in FIG. 8. The punch was brought into contact with the gel, and a maximum compressive load of 5 mN was applied for 5 minutes. A tensile force was observed when the punch was then retracted from the gel, indicating that there is some adhesion between the steel punch and the hydrogel, even in the absence of DOPA.

FIG. 8 is a load-displacement curve for hydrogel after equilibration with a saturated water environment. The hydrogel was formed from a 20% solution of the triblock copolymer in DMSO.

PMMA-PMAA-PMMA triblock copolymers can be completely dissolved in toxicologically acceptable solvents such as NMP, EtOH and DMSO, as well as other solvents such as MeOH and DMF. Hydrogels are formed by a simple solvent exchange mechanism, during exposure of polymer solutions to water vapor. The elastic moduli are relatively high (~15-30 MPa), which is consistent with the relatively high polymer volume fractions in the gel after the solvent exchange process is completed.

DOPA-modified hydrogels were prepared in the same manner from DMSO solutions of DOPA-modified copolymer. The gel obtained after solvent exchange was de-swollen and opaque, and did not swell at all when immersed in neutral water. This behavior is attributed to the relatively hydrophobic character of the DOPA moieties in the midblock. In order to obtain swollen gels, they were immersed in pH10 buffer solutions after solvent exchange. The gel swelled, became a transparent red, and then became a deep red, which is an indication of DOPA oxidation. The modulus of the swollen DOPA-hydrogel was found to be 1.3 kPa by indentation method.

Axisymmetric Adhesion Tests

Adhesion of DOPA-modified hydrogel in contact with $TiO_2$ was measured with the indentation method. A flat punch coated with $TiO_2$ was brought into contact with the hydrogel, and a maximum compressive load of 5 mN was applied. The load was retracted until the surfaces were separated. Contact curves of original hydrogel (without DOPA) show very little hysteresis, as shown in FIG. 5. On the other hand, a significant negative load (tensile load, Pt) was developed when the TiO2-coated punch was retracted from the gel, an indication of adhesion between hydrogel surface and the metal oxide surface. For the DOPA modified hydrogel we calculate a critical energy release rate, Gc of≈27 mJ/m2, from the maximum tensile load at pulloff. Young's modulus (E) of the gels was obtained from the slope of advancing portion of load displacement data, according to Eq. 2. Results are summarized in Table 1 (below).

In this study a polymer system was developed that was intended to mimic mussel adhesive proteins, and was capable of self assembling into an adhesive hydrogel when injected into an aqueous environment. DOPA modified PMMA-PMAA-PMMA triblock copolymers described in this study are potential candidates for in situ gel forming bioadhesive materials suitable for tissue repair and regeneration.

Table 1 properties of gels initially prepared from DMSO solution, and equilibrated in controlled buffer (pH=10). Φin and Φp are the respective polymer concentrations of the initial solution prior to solvent exchange, and the swollen gel equilibrated in buffer solution.

| Hydrogel | Φin | Φp | E (kPa) | G (mJ/m2) |
|---|---|---|---|---|
| Original | 0.1 | 0.01 | 1.6- | |
| DOPA Modified | 0.2 | 0.05 | 2.6 | 27 |

Highly swollen hydrogels were formed for pH values greater than 4, with G≈1 kPa. This is attributed to ionization of the methacrylic acid mid-blocks. At neutral pH the gels formed from the triblock with high DOPA content was stiffer, and opaque. A transparent red gel was obtained by immersing the preformed gel in pH=10 buffer. The red color is an indication of DOPA oxidation. These DOPA modified hydrogels had a modulus of 2.6 kPa. The presence of oxidized DOPA significantly increased the adhesion to TiO2 surfaces that had been immersed in water.

Figure 10:
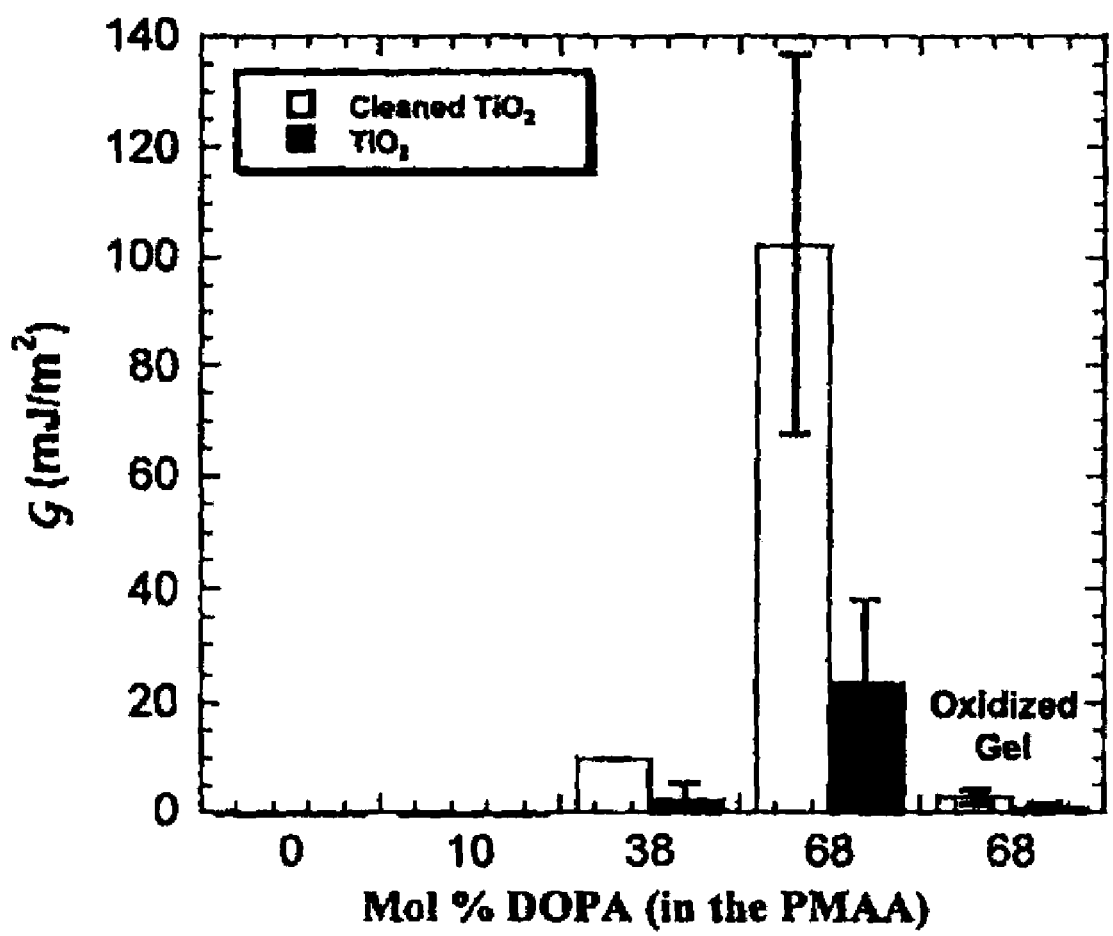
FIG. 10 illustrates adhesion of DOPA-modified hydrogels submerged in water to UV-ozone cleaned (white) or untreated (black) TiO$_2$ surfaces. The oxidized hydrogels were submerged within a pH 10 solution for four days prior to adhesion experiment.

FIG. 10 shows the amount of energy required to separate the DOPA-modified hydrogels from wetted $TiO_2$ surfaces. The adhesion energy increased with increasing DOPA content in the block copolymer on both UV-ozone treated and untreated $TiO_2$ surfaces. This experiment also demonstrated that the unoxidized form of DOPA is responsible for the water-resistant adhesion as the adhesive strength of the oxidized hydrogels was reduced by over 20 fold.

REFERENCES INCORPORATED HEREIN BY REFERENCE

The following publications are incorporated by reference herein:

"Synthesis and Adhesion Properties of DOPA Incorporated Acrylic Triblock Hydrogels", Guvendiren, Murat, Bruce P. Lee, Phillip B. Messersmith and Kenneth R. Shull, Department of Materials Science and Engineering, Northwestern University, Evanston, Ill.; Department of Biomedical Engineering, Northwestern University, Evanston, Ill.

Tae G., Komfield J. A., Hubbel J. A., *Biomaterials*, 2005, 26, 5259-5266.

Yu M., Hwang J., and Deming T. J., *J. Am Chem. Soc*, 1999, 121, 5825-5826.

Shull K. R., *Mat. Sci. Eng.*, 2002, R36, 1-45.

Webber R. E., et al., *Physical Review E*, 2003, 68, 021805.

Crosby A. J., et al., J. Rheology, 2002, 46, 273.

"Alpha, Beta-Dehydro-3,4-Dihydroxyphenylalanine Derivatives—Potential Schlerotization Intermediates in Natural Composite-Materials", Rzepecki, L. M., Nagafuchi, T., and Waite, J. H., *Arch. Biochem. Biophys.* 1991, 285, 17-26.

"Hydroxyarginine-Containing Polyphenolic Proteins in the Adhesive Plaques of the Marine Mussel Mytilus-Edulis", Papov, V. V., Diamond, T. V., Biemann, K., and Waite, J. H., *J. Biol. Chem.* 1995, 270, 20183-92.

"Wresting the muscle from mussel beards: Research and applications", Rzepecki, L. M. and Waite, J. H., *Mol. Mar. Biol. Biotechnol.* 1995, 4, 313-22.

Waite, J. H., in *Redox-Active Amino Acids in Biology*, 1995, Vol. 258, p. 1-20.

"Enzymatic tempering of a mussel adhesive protein film", Hansen, D. C., Corcoran, S. G., and Waite, J. H., *Langmuir* 1998, 14, 1139-47.

"Mytilus edulis adhesive protein (MAP) as an enzyme immobilization matrix in the fabrication of enzyme-based electrodes", Saby, C. and Luong, J. H. T., *Electroanalysis* 1998, 10, 1193-9.

"Synthetic polypeptide mimics of marine adhesives", Yu, M. E. and Deming, T. J., *Macromolecules* 1998, 31, 4739-45.

"Mussel byssus and biomolecular materials", Deming, T. J., *Current Opinion In Chemical Biology* 1999, 3, 100-5.

"Expression of multiple forms of an adhesive plaque protein in an individual mussel, Mytilus edulis", Warner, S. C. and Waite, J. H., *Mar. Biol.* 1999, 134, 729-34.

"Synthesis and characterization of self-assembling block copolymers containing adhesive moieties", Huang, K., Lee, B., and Messersmith, P. B., *Polym. Prepr. (Am. Chem. Soc., Div. Polym. Chem.)* 2001, 42, 147-8.

"Enzymatic and non-enzymatic pathways to formation of DOPA-modified PEG hydrogels", Lee, B. P., Dalsin, J. L., and Messersmith, P. B., *Polym. Prepr. (Am. Chem. Soc., Div. Polym. Chem.)* 2001, 42, 151-2.

"Synthesis of 3,4-dihydroxyphenylalanine (DOPA) containing monomers and their co-polymerization with PEG-diacrylate to form hydrogels", Lee, B. P., Huang, K., Nunalee, N., Shull, K. R., and Messersmith, P. B., *J. Biomater. Sci. Polymer Ed.* 2004, 15, 449-64.

E. Ruel-Gariepy and J.-C. Leroux, *European Journal of Pharmaceutics and Biopharmaceutics*, 2004, 58, 409-426.

S. Dai, P. Ravi, K. C. Tam, B. W. Mao and L. H. Gan, *Langmuir*, 2003, 19, 5175-5177.

A. Rozier, C. Mazuel, J. Grove and B. Plazonnet, *International Journal of pharmaceutics*, 1989, 57, 163-168.

G. Tae, J. A. Komfield and J. A. Hubbell, *Biomaterials*, 2005, 26, 5259-5266.

B. P. Lee, C.-Y. Chao, F. N. Nunalee, E. Motan, K. R. Shull and P. B. Messersmith, *Macromolecules*, 2006, 39, 1740-1748.

B. P. Lee, J. L. Dalsin and P. B. Messersmith, *Biomacromolecules*, 2002, 3, 1038-1047.

What is claimed is:

1. An anionic polymerization method to prepare a block copolymer, comprising the steps:
    reacting a difunctional anionic initiator with a sterically hindered ester of methacrylic acid (SEMA);
    reacting the anionically polymerized hindered ester of methacrylic acid with methacrylic acid (MMA);
    hydrolyzing the anionically polymerized block copolymer with an aqueous solution to obtain a methyl methacrylate-methacrylic acid-methyl methacrylate block copolymer (MMA-MAA-MMA); and
    reacting the MMA-MAA-MMA block copolymer with 3,4-dihydroxyphenyl alanine to obtain an amide with the MAA portion of the block copolymer.

2. The anionic polymerization method of claim 1, wherein the sterically hindered ester of methacrylic acid is t-butyl methacrylate (tBMA).

3. The anionic polymerization method of claim 1, wherein the difunctional anionic initiator is an anion product of two diphenylethylene molecules.

* * * * *